(12) United States Patent
Clark et al.

(10) Patent No.: US 8,494,134 B2
(45) Date of Patent: Jul. 23, 2013

(54) METHOD AND SYSTEM FOR ROUTING CALLS PLACED TO A TELEPHONY IDENTIFIER ASSOCIATED WITH A GROUP OF IDENTITIES

(75) Inventors: David William Clark, Carp (CA); Eric John Wolf, Stittsville (CA); Yannick Lessard, Gatineau (CA); Danica Rogers, Ottawa (CA); Nathan Gerald Archer, Russell (CA); Jonathan Allan Arsenault, Orleans (CA); Luan Cao Tuong Nguyen, Nepean (CA)

(73) Assignee: BCE Inc., Verdun, Québec (CA)

( * ) Notice: Subject to any disclaimer, the term of this patent is extended or adjusted under 35 U.S.C. 154(b) by 113 days.

(21) Appl. No.: 12/809,806

(22) PCT Filed: Dec. 19, 2007

(86) PCT No.: PCT/CA2007/002279
§ 371 (c)(1),
(2), (4) Date: Jun. 21, 2010

(87) PCT Pub. No.: WO2009/076739
PCT Pub. Date: Jun. 25, 2009

(65) Prior Publication Data
US 2010/0290609 A1    Nov. 18, 2010

(51) Int. Cl.
*H04M 1/56*    (2006.01)
*H04M 15/06*    (2006.01)
(52) U.S. Cl.
USPC ............ 379/142.06; 379/142.04; 379/142.07; 379/245

(58) Field of Classification Search
USPC ............ 379/142.01, 142.04, 142.06, 142.07, 379/142.17, 245, 246
See application file for complete search history.

(56) References Cited

U.S. PATENT DOCUMENTS

| | | | | |
|---|---|---|---|---|
| 5,220,599 A | * | 6/1993 | Sasano et al. | 379/142.06 |
| 5,276,731 A | * | 1/1994 | Arbel et al. | 379/211.02 |
| 5,299,260 A | | 3/1994 | Shaio | |
| 5,329,578 A | | 7/1994 | Brennan et al. | |
| 5,392,342 A | * | 2/1995 | Rosenthal | 379/211.03 |
| 5,430,791 A | * | 7/1995 | Feit et al. | 379/88.01 |

(Continued)

FOREIGN PATENT DOCUMENTS

| | | |
|---|---|---|
| CA | 2533514 | 2/2005 |
| EP | 0569164 | 10/1993 |

(Continued)

OTHER PUBLICATIONS

Supplementary European Search Report completed on Nov. 26, 2010 in connection with European Patent Application 07 855 626, 4 pages.

(Continued)

*Primary Examiner* — Binh Tieu

(57) ABSTRACT

A method for processing a call placed to a telephony identifier. The method comprises: obtaining information regarding an origin of the call; identifying a group of identities that is associated with the telephony identifier, each identity designating a party reachable by calling the telephony identifier; determining, based on the information regarding the origin of the call, that the call is intended for a particular identity among the group of identities; and causing routing of the call based on information associated with the particular identity. The party designated by each identity may be a different person. Also provided a system for processing a call placed to a telephony identifier.

48 Claims, 3 Drawing Sheets

U.S. PATENT DOCUMENTS

| | | | |
|---|---|---|---|
| 5,465,295 A | | 11/1995 | Furman |
| 5,506,890 A | | 4/1996 | Gupta et al. |
| 5,533,107 A | | 7/1996 | Irwin et al. |
| 5,764,746 A | | 6/1998 | Reichelt |
| 5,793,859 A | * | 8/1998 | Matthews ............... 379/211.03 |
| 5,875,240 A | * | 2/1999 | Silverman ............... 379/142.07 |
| 5,987,100 A | | 11/1999 | Fortman et al. |
| 5,999,613 A | | 12/1999 | Nabkel et al. |
| 6,005,870 A | | 12/1999 | Leung et al. |
| 6,067,349 A | | 5/2000 | Suder et al. |
| 6,295,353 B1 | | 9/2001 | Flockhart et al. |
| 6,304,573 B1 | | 10/2001 | Hicks, III |
| 6,389,117 B1 | | 5/2002 | Gross et al. |
| 6,438,217 B1 | | 8/2002 | Huna |
| 6,529,592 B1 | | 3/2003 | Khan |
| 6,668,055 B2 | | 12/2003 | Marwell et al. |
| 6,728,360 B1 | | 4/2004 | Brennan |
| 6,788,778 B2 | * | 9/2004 | Tatsumi ........................ 379/234 |
| 6,826,271 B1 | | 11/2004 | Kanabar et al. |
| 6,829,332 B2 | | 12/2004 | Farris et al. |
| 6,898,274 B1 | | 5/2005 | Galt et al. |
| 6,961,559 B1 | | 11/2005 | Chow et al. |
| 7,162,021 B1 | | 1/2007 | Johnson et al. |
| 7,269,412 B2 | | 9/2007 | Bacon et al. |
| 7,280,646 B2 | | 10/2007 | Urban et al. |
| 7,283,512 B2 | | 10/2007 | Hall |
| 7,295,656 B2 | | 11/2007 | Ruckart |
| 7,388,949 B2 | | 6/2008 | Contractor et al. |
| 7,474,432 B1 | | 1/2009 | Kirchhoff et al. |
| 7,609,832 B2 | | 10/2009 | Kreiner et al. |
| 7,672,444 B2 | | 3/2010 | Perrella et al. |
| 8,023,632 B2 | * | 9/2011 | Gruchala ................. 379/201.02 |
| 8,031,851 B2 | * | 10/2011 | Holt et al. ................. 379/201.02 |
| 2002/0039407 A1 | | 4/2002 | O'Donovan et al. |
| 2002/0086662 A1 | | 7/2002 | Culliss |
| 2003/0003900 A1 | | 1/2003 | Goss et al. |
| 2003/0058839 A1 | | 3/2003 | D'Souza |
| 2003/0060210 A1 | | 3/2003 | Ravishankar et al. |
| 2004/0028026 A1 | | 2/2004 | McClung et al. |
| 2004/0095925 A1 | | 5/2004 | Cody et al. |
| 2005/0053218 A1 | | 3/2005 | Kim |
| 2005/0054335 A1 | | 3/2005 | Pearson et al. |
| 2005/0064855 A1 | | 3/2005 | Russell |
| 2005/0100155 A1 | | 5/2005 | Trinkel et al. |
| 2005/0207361 A1 | | 9/2005 | Rosenberg et al. |
| 2005/0245236 A1 | | 11/2005 | Servi et al. |
| 2006/0029195 A1 | | 2/2006 | Mullis et al. |
| 2006/0177033 A1 | | 8/2006 | Allen et al. |
| 2006/0190591 A1 | | 8/2006 | Bobde et al. |
| 2007/0111743 A1 | | 5/2007 | Leigh et al. |
| 2007/0143397 A1 | | 6/2007 | Guedalia et al. |
| 2007/0147349 A1 | | 6/2007 | Bangor et al. |
| 2007/0153991 A1 | | 7/2007 | Daigle |
| 2007/0155370 A1 | | 7/2007 | Daigle |
| 2007/0263781 A1 | | 11/2007 | Goldman et al. |
| 2007/0299927 A1 | | 12/2007 | Knauerhase |
| 2009/0055502 A1 | | 2/2009 | Agarwal et al. |
| 2009/0086720 A1 | * | 4/2009 | Westlake ..................... 370/352 |
| 2009/0111474 A1 | | 4/2009 | Hill et al. |
| 2009/0247188 A1 | | 10/2009 | Ridley et al. |
| 2012/0106725 A1 | * | 5/2012 | Smith et al. .............. 379/201.02 |

FOREIGN PATENT DOCUMENTS

| | | |
|---|---|---|
| EP | 1211875 | 6/2002 |
| EP | 1583341 | 10/2005 |
| EP | 1684478 | 7/2006 |
| GB | 2387737 | 1/2006 |
| JP | 2002016701 | 1/2002 |
| WO | 9107041 | 5/1991 |
| WO | 03041362 | 5/2003 |
| WO | 2006129296 | 12/2006 |
| WO | 2007033457 | 3/2007 |
| WO | 2007056824 | 5/2007 |
| WO | 2007071007 | 6/2007 |
| WO | WO2008042990 | 4/2008 |
| WO | 2008067631 | 6/2008 |
| WO | 2008077226 | 7/2008 |

OTHER PUBLICATIONS

Nunn, A., "Voice Evolution", BT Technology Journal, Kluwer Academic Publishers, DO, vol. 23, No. 1, Jan. 1, 2005, pp. 120-133, XP019218795, ISSN: 1573-1995, DOI: DOI: 10.1007/S10550-005-0113-3.

Supplementary European Search Report completed on Sep. 30, 2011 in connection with European Patent 07 855 645, 7 pages.

International Search Report mailed on Aug. 21, 2008 in connection with International patent application PCT/CA2007/002323, 3 pages.

International Search Report mailed on Sep. 9, 2008 in connection with International patent application PCT/CA2007/002347, 6 pages.

Written Opinion of the International Searching Authority mailed Sep. 9, 2008 in connection with International patent application PCT/CA2007/002347, 10 pages.

International Search Report mailed on Sep. 9, 2008 in connection with International patent application PCT/CA2007/002279, 3 pages.

International Search Report mailed on Sep. 29, 2008 in connection with International patent application PCT/CA2007/002363, 4 pages.

International Search Report mailed on Sep. 17, 2008 in connection with International patent application PCT/CA2007/002346, 3 pages.

Tyson J. et al., "How VoIP Works", 2005, http://www.engedi.net/documents/HowVoIPWorks_Feb.pdf, Sep. 2008, 7 pages.

Written Opinion of the International Searching Authority mailed on Sep. 17, 2008 in connection with International patent application PCT/CA2007/002346, 6 pages.

International Search Report mailed on Sep. 19, 2008 in connection with International patent application PCT/CA2007/002364, 3 pages.

Written Opinion of the International Searching Authority mailed on Sep. 19, 2008 in connection with International patent application PCT/CA2007/002364, 4 pages.

Written Opinion of the International Searching Authority mailed Aug. 21, 2008 in connection with International patent application PCT/CA2007/002323, 5 pages.

Written Opinion of the International Searching Authority mailed Sep. 9, 2008 in connection with International patent application PCT/CA2007/002279, 5 pages.

Written Opinion of the International Searching Authority mailed Sep. 29, 2008 in connection with International patent application PCT/CA2007/002363, 6 pages.

Written Opinion of the International Searching Authority mailed on Sep. 24, 2008 in connection with International patent application PCT/CA2007/002365, 5 pages.

International Search Report mailed on Sep. 24, 2008 in connection with International Patent Application PCT/CA2007/002365, 4 pages.

International Preliminary Report on Patentability completed on Apr. 15, 2010 in connection with International Patent Application PCT/CA2007/002362, 5 pages.

Extended European Search Report completed on Nov. 26, 2010 in connection with European Patent Application 07 85 5626, 4 pages.

Office Action issued on May 25, 2012 in connection with U.S. Appl. No. 12/673,233, 9 pages.

Examiner's Report issued on Jun. 4, 2012 in connection with Canadian Patent Application 2,647,920, 2 pages.

Supplementary European Search Report issued on May 22, 2012, in connection with European Patent Application 07855561, 6 pages.

Office Action issued on Aug. 31, 2012 in connection with U.S. Appl. No. 12/809,711, 30 pages.

Office Action issued on Oct. 5, 2012 in connection with U.S. Appl. No. 12/643,010, 9 pages.

Office Action issued on Oct. 15, 2012 in connection with U.S. Appl. No. 12/673,233, 12 pages.

Office Action issued on Nov. 8, 2012 in connection with U.S. Appl. No. 12/745,352, 22 pages.

Office Action issued on Feb. 8, 2013 in connection with U.S. Appl. No. 12/809,711, 41 pages.

Office Action issued on Jan. 4, 2013 in connection with U.S. Appl. No. 12/809,407, 31 pages.

* cited by examiner

METHOD AND SYSTEM FOR ROUTING CALLS PLACED TO A TELEPHONY IDENTIFIER ASSOCIATED WITH A GROUP OF IDENTITIES

FIELD OF THE INVENTION

The present invention relates generally to telecommunications and, more particularly, to a method and a system for routing calls placed to a telephone number or other telephony identifier that is associated with a group of identities.

BACKGROUND

Different people in a household or other social unit typically have vastly different social networks. As a result, incoming calls, which can have various origins and can be intended for anyone in the household or other social unit, can often give rise to nuisances or inefficiencies. For example, in a household with parents and children, the parents may frequently answer calls that are intended for their children. In some cases, this may prove quite frustrating for the parents who may unnecessarily be distracted and/or waste time.

Similar nuisances or inefficiencies can also arise in connection with incoming calls pertaining to different aspects of a person's life. For example, a person may receive incoming calls pertaining to his/her personal life as well as incoming calls pertaining to his/her work or business. In some cases, with no distinction being made between these two types of calls, the person may experience undesirable situations, such as receiving personal calls during business meetings or answering business calls in an inadequate manner when thinking they are personal calls.

For these and various other situations, there exists a need for solutions directed to handling incoming calls depending on who or what they are intended for.

SUMMARY OF THE INVENTION

As embodied and broadly described herein, the present invention provides a method for processing a call placed to a telephony identifier. The method comprises: obtaining information regarding an origin of the call; identifying a group of persons that is associated with the telephony identifier; determining, based on the information regarding the origin of the call, that the call is intended for a particular person among the group of persons; and causing routing of the call based on information associated with the particular person.

The present invention also provides an apparatus for processing a call placed to a telephony identifier. The apparatus comprises a processing entity for: obtaining information regarding an origin of the call; identifying a group of persons that is associated with the telephony identifier; and determining, based on the information regarding the origin of the call, that the call is intended for a particular person among the group of persons. The apparatus also comprises a routing entity for causing routing of the call based on information associated with the particular person.

The present invention also provides a system for processing a call placed to a telephony identifier. The system comprises: means for obtaining information regarding an origin of the call; means for identifying a group of persons that is associated with the telephony identifier; means for determining, based on the information regarding the origin of the call, that the call is intended for a particular person among the group of persons; and means for causing routing of the call based on information associated with the particular person.

The present invention also provides a computer-readable media storing a program component for execution by a computer system to process a call placed to a telephony identifier. The program component comprises: first program code for causing the computer system to obtain information regarding an origin of the call; second program code for causing the computer system to identify a group of persons that is associated with the telephony identifier; third program code for causing the computer system to determine, based on the information regarding the origin of the call, that the call is intended for a particular person among the group of persons; and fourth program code for causing the computer system to cause routing of the call based on information associated with the particular person.

The present invention also provides a method for processing a call placed to a telephony identifier. The method comprises: obtaining information regarding an origin of the call; identifying a group of identities that is associated with the telephony identifier, each identity designating a party reachable by calling the telephony identifier; determining, based on the information regarding the origin of the call, that the call is intended for a particular identity among the group of identities; and causing routing of the call based on information associated with the particular identity.

The present invention also provides an apparatus for processing a call placed to a telephony identifier. The apparatus comprises a processing entity for: obtaining information regarding an origin of the call; identifying a group of identities that is associated with the telephony identifier, each identity designating a party reachable by calling the telephony identifier; and determining, based on the information regarding the origin of the call, that the call is intended for a particular identity among the group of identities. The apparatus also comprises a routing entity for causing routing of the call based on information associated with the particular identity.

The present invention also provides a system for processing a call placed to a telephony identifier. The system comprises: means for obtaining information regarding an origin of the call; means for identifying a group of identities that is associated with the telephony identifier, each identity designating a party reachable by calling the telephony identifier; means for determining, based on the information regarding the origin of the call, that the call is intended for a particular identity among the group of identities; and means for causing routing of the call based on information associated with the particular identity.

The present invention also provides computer-readable media storing a program component for execution by a computer system to process a call placed to a telephony identifier. The program component comprises: first program code for causing the computer system to obtain information regarding an origin of the call; second program code for causing the computer system to identify a group of identities that is associated with the telephony identifier, each identity designating a party reachable by calling the telephony identifier; third program code for causing the computer system to determine, based on the information regarding the origin of the call, that the call is intended for a particular identity among the group of identities; and fourth program code for causing the computer system to cause routing of the call based on information associated with the particular identity.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of certain embodiments of the present invention is provided herein below, by way of example only, with reference to the accompanying drawings, in which.

It is to be expressly understood that the description and drawings are only for the purpose of illustration of example embodiments of the invention and are an aid for understanding. They are not intended to be a definition of the limits of the invention.

DETAILED DESCRIPTION OF EMBODIMENTS

Figure 1:
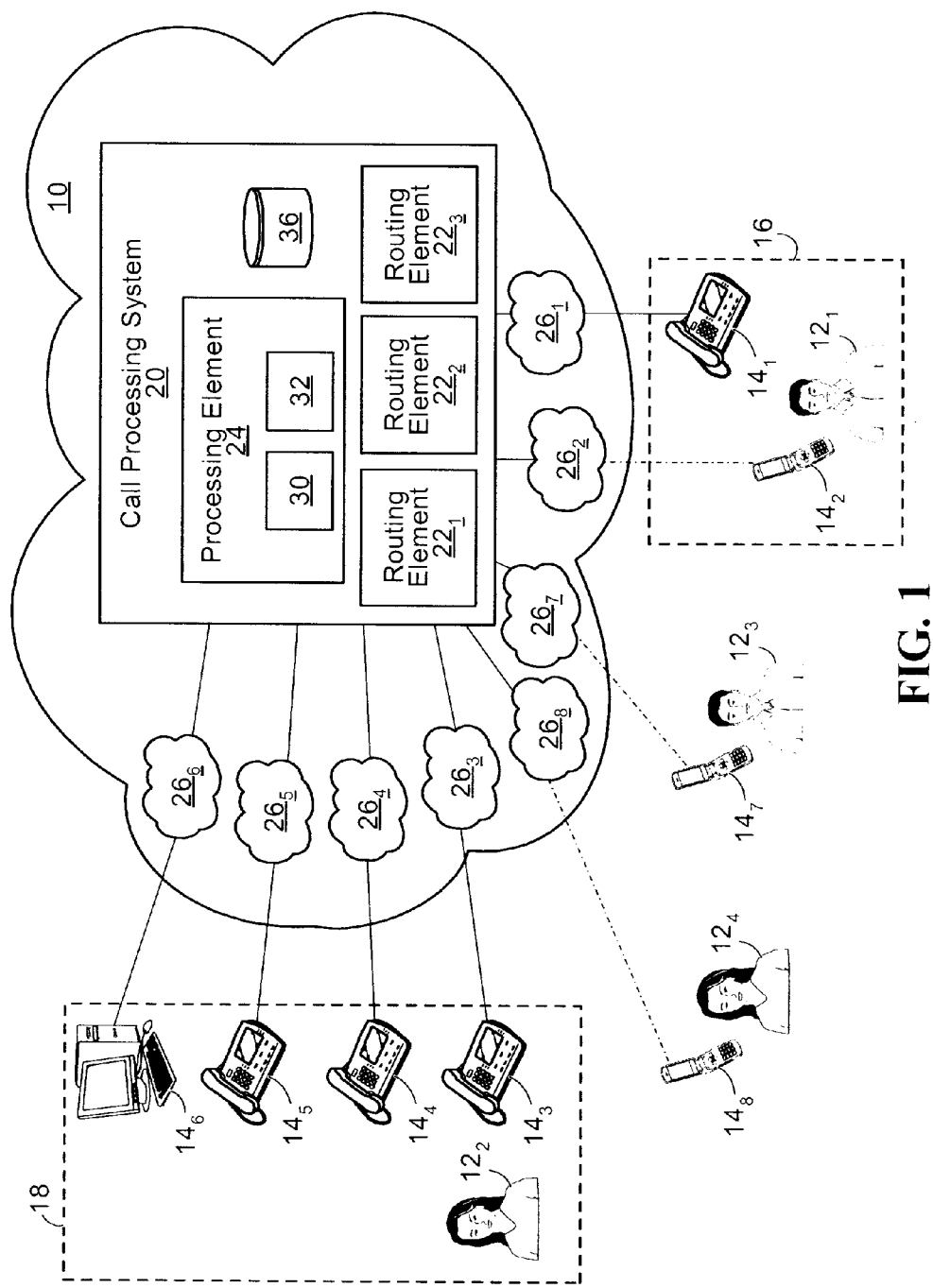
FIG. 1 shows a communications network allowing users of communication devices to effect telephonic communications, the communications network comprising a call processing system in accordance with an embodiment of the invention.

FIG. 1 shows a communications network 10 allowing users of communication devices, including users $12_1 \ldots 12_4$ of communication devices $14_1 \ldots 14_8$, to effect telephonic communications (e.g., receive and originate calls). The communications network 10 may comprise a portion of one or more of the Public Switched Telephone Network (PSTN), a wireless network (e.g., a cellular network), and a data network (e.g., the Internet).

Various types of communication devices may be used by users to effect telephonic communications. For example, in various embodiments, a communication device used by a user (such as any one of the communication devices $14_1 \ldots 14_8$) may be a wired Plain Old Telephony System (POTS) phone (including a cordless phone), a wireless phone (e.g., a cellular phone or other mobile communication device, including a telephony-enabled personal digital assistant (PDA)), a Voice-over-Internet Protocol (VoIP) phone, a POTS phone equipped with an analog terminal adapter (ATA), a softphone (i.e., a computer equipped with telephony software), or a telephony-enabled television unit (e.g. a set-top box connected to a television and a remote control). Depending on functionality of a given communication device (such as any one of the communication devices $14_1 \ldots 14_8$), a call originated or received by the given communication device may be a voice call, a video call, a multimedia call, or any other type of call. Also, depending on its functionality, a given communication device (such as any one of the communication devices $14_1 \ldots 14_8$) may allow other communications to be effected (e.g., send and receive text, multimedia, email and/or instant messaging (IM) messages).

In this embodiment, the users $12_1 \ldots 12_4$ are members of a family. More particularly, in this example, the users $12_1$ and $12_2$ are parents, respectively father and mother, and the users $12_3$ and $12_4$ are their children, in this case, son and daughter, respectively. Also, in this embodiment: the communication device $14_1$ is a POTS phone located at a workplace 16 of the user $12_1$; the communication device $14_2$ is a wireless phone carried by the user $12_1$; the communication devices $14_3 \ldots 14_6$ are located at a residence 18 (e.g., a house) of the users $12_1 \ldots 12_4$, with the communication device $14_3$ being a VoIP phone located in a common area (e.g., a kitchen or living room) of the residence 18, the communication device $14_4$ being an ATA-equipped POTS phone located in a bedroom of the users $12_1$ and $12_2$, the communication device $14_5$ being a VoIP phone located in a bedroom of the user $12_3$, and the communication device $14_6$ being a softphone located in a bedroom of the user $12_4$; the communication device $14_7$ is a wireless phone carried by the user $12_3$; and the communication device $14_8$ is a wireless phone carried by the user $12_4$.

It will be appreciated that, while in this embodiment the communication devices $14_1 \ldots 14_8$ are certain types of devices that are associated in a particular manner with the users $12_1 \ldots 12_4$, in other embodiments, the communication devices $14_1 \ldots 14_8$ may be other types of devices and may be associated in other manners with the users $12_1 \ldots 12_4$. It will also be appreciated that this embodiment where the users $12_1$-$12_4$ are family members is presented for illustrative purposes only and that, in other embodiments, various users of communication devices may have various different affiliations or no particular affiliation.

The communication devices $14_1 \ldots 14_8$ are connected to a call processing system 20 via various network portions of the communications network 10. The call processing system 20 is operative to effect various call processing operations when a communication device (such as any one of the communication devices $14_1 \ldots 14_8$) is destined to receive an incoming call or is used to originate an outgoing call or participate in a call in progress. The call processing system 20 comprises suitable hardware, firmware, software or a combination thereof for implementing a plurality of functional elements, including a processing element 24 and a plurality of routing elements $22_1 \ldots 22_3$, whose functions are discussed below. More particularly, in this embodiment:

The communication device $14_1$ (in this case, a wired POTS phone) is connected to the routing element $22_1$ of the call processing system 20 via a network portion $26_1$ of the communications network 10. The network portion $26_1$ may comprise a telephone line in the PSTN and possibly one or more other network components (e.g., routing elements, gateways, etc.). The routing element $22_1$ is operative to perform operations to cause establishment of a call destined for or originated by the communication device $14_1$. For example, the routing element $22_1$ may be implemented by a central office telephone switch.

The communication device $14_2$ (in this case, a wireless phone) is connected to the routing element $22_2$ of the call processing system 20 via a network portion $26_2$ of the communications network 10. The network portion $26_2$ may comprise a wireless link in combination with a base station and a wireline link, and possibly one or more other network components (e.g., routing elements, gateways, etc.). The routing element $22_2$ is operative to perform operations to cause establishment of a call destined for or originated by the communication device $14_2$. For example, the routing element $22_2$ may be implemented by a mobile switching center.

Similarly, the communication devices $14_7$ and $14_8$ (in this case, wireless phones) are connected to the routing element $22_2$ of the call processing system 20 via network portions $26_7$ and $26_8$ of the communications network 10. Each of the network portions $26_7$ and $26_8$ may comprise a wireless link in combination with a base station and a wireline link, and possibly one or more other network components (e.g., routing elements, gateways, etc.). The routing element $22_2$ is operative to perform operations to cause establishment of a call destined for or originated by any of the communication devices $14_7$ and $14_8$. It will be appreciated that, in other embodiments, the communication devices $14_7$ and $14_8$ may be connected to one or more other routing elements of the call processing system 20 (e.g., where the wireless phones $14_2$, $14_7$ and $14_8$ are serviced by different service providers which may operate different routing elements).

The communication devices $14_3 \ldots 14_6$ (each of which is, in this case, a VoIP phone, ATA-equipped POTS phone or softphone) are connected to the routing element $22_3$ of the call processing system 20 via network portions $26_3 \ldots 26_6$ of the communications network 10. Each of the network portions $26_3 \ldots 26_6$ may comprise a digital communications link (e.g., a digital subscriber line (DSL) link, a cable link, or a wireless data link such as a WiMAX link) and possibly one or more other network components (e.g., routing elements, gateways, etc.). While they are shown as distinct from one another in FIG. 1, it will be appreciated that some or all of the network portions $26_3 \ldots 26_6$ may be implemented as a common network portion that branches off at the residence 18. For instance, in some cases, certain ones of the communication devices $14_3 \ldots 14_6$ (e.g., the communication devices $14_3$, $14_5$ and $14_6$) may be connected to a local router at the residence 18.

The routing element $22_3$ is operative to perform operations to cause establishment of a call destined for or originated by any of the communication device $14_3 \ldots 14_6$. For example, the routing element $22_3$ may be implemented by a softswitch, a router (e.g., an edge router or a core router), or a server equipped with a modem. It will be appreciated that, in other embodiments, some of the communication devices $14_3 \ldots 14_6$ may be connected to one or more other routing elements of the call processing system 20 (e.g., where two or more of the communication devices $14_3 \ldots 14_6$ are serviced by different service providers which may operate different routing elements).

It will be appreciated that each of the network portion $26_1 \ldots 26_8$ may span across different networks (e.g., PSTN, wireless, and/or data networks) in which case it may comprise one or more gateways enabling communication and interoperability between these networks. Such gateways are well known and need not be described in further detail.

It will also be appreciated that, while in this embodiment the communication devices $14_1 \ldots 14_8$ are connected to the call processing system 20 in a certain manner, communication devices such as the communication devices $14_1 \ldots 14_8$ may be connected to the call processing system 20 in various other manners in other embodiments.

With continued reference to FIG. 1, in this embodiment, the call processing system 20 is operated by a service provider that provides communication services to various users of communication devices (including, in this case, the users $12_1 \ldots 12_4$). It will be recognized however that, in other embodiments, different functional elements of the call processing system 20 may be operated by different service providers.

In some embodiments, two or more of the processing element 24 and the routing elements $22_1 \ldots 22_3$ of the call processing system 20 may be functional elements implemented by a common network component. In particular, the processing element 24 and one or more of the routing elements $22_1 \ldots 22_3$ may be implemented by a common network component. For example, in some embodiments, the processing element 24 and the routing element $22_3$ may be functional elements of a softswitch or other server.

Also, in some embodiments, two or more of the processing element 24 and the routing elements $22_1 \ldots 22_3$ of the call processing system 20 may be functional elements implemented by different network components that are linked by one or more physical (i.e., wired or wireless) communication links and possibly other network components (e.g., gateways) of the communications network 10. For example, in some embodiments, the processing element 24 and the routing element $22_3$ may be functional elements of a softswitch or other server, while the routing element $22_1$ is a functional element of a central office telephone switch and the routing element $22_2$ is a functional element of a mobile switching center, whereby the central office telephone switch and the mobile switching center are linked to the softswitch or other server via communication links and possibly other network components of the communications network 10.

The processing element 24 comprises suitable hardware, firmware, software or a combination thereof for implementing a plurality of functional entities, including a processing entity 30 and a routing entity 32, which are configured to perform various operations when a communication device (such as any one of the communication devices $14_1 \ldots 14_8$) is destined to receive an incoming call or is used to originate an outgoing call or participate in a call in progress.

More particularly, the processing entity 30 implements a call processing logic to process a call destined for, originated by, or in progress at a communication device (such as any one of the communication devices $14_1 \ldots 14_8$). For example, the call processing logic may be defined by a sequence of decisions to be taken with respect to a given call, which may lead to one or more actions being performed based on those decisions.

Each decision taken with respect to a given call may be based on one or more factors. A factor on which is based a decision to be taken with respect to a given call may be defined in terms of information regarding the given call. For example, information regarding a given call may include information regarding an origin of the given call such as: the given call's origin which may be expressed, for instance, as a telephone number or other identifier (e.g., an Internet Protocol (IP) address or another Uniform Resource Identifier (URI) such as a Session Initiation Protocol (SIP) URI) identifying a device that originated the given call or as a name or other identifier of a calling party that originated the call: a time at which the given call was originated (e.g., a day, hour, minute, etc.); and/or a location (e.g., a city or street address) where the given call was originated. As another example, information regarding a given call may include information regarding a destination of the given call as specified by a calling party that originated the call, such as the given call's intended destination, which may be expressed, for instance, as a telephone number or other identifier (e.g., an IP address or SIP URI) identifying a device for which the call is destined or as a name or other identifier of a called party for which the call is destined. A factor on which is based a decision to be taken with respect to a given call may also be defined in terms of certain information included in a database 36 that may be accessed by the processing entity 30.

One or more actions are performed based on one or more decisions taken with respect to a given call, such as route the given call to a certain destination, cause a distinctive ringing to be effected to announce the given call, block the given call, etc. The routing entity 32 is operative to cause these one or more actions to be performed. For example, for a given call destined for, originated by, or in progress at one of the communication devices $14_1 \ldots 14_8$, the routing entity 32 may cause a given one of the routing elements $22_1 \ldots 22_3$ to perform these one or more actions.

In accordance with an embodiment of the present invention, a telephone number or other telephony identifier enabling establishment of calls may be associated with a group of "identities", where each "identity" designates a party reachable by placing a call to this telephone number or other telephony identifier. The party designated by an identity may be a person or a group of persons. Also, in some cases, a person may have a plurality of identities (e.g., a personal identity for his/her personal life and a business identity for business purposes).

As further discussed below, this association of a telephone number or other telephony identifier with a group of identities is particularly useful from various perspectives. For example, this may allow multiple persons and/or multiple communication devices to share a common telephone number or other telephony identifier, and have an incoming call placed to that telephone number or other telephony identifier routed according to which identity it is determined to be intended for. In addition, a single consolidated bill may be issued by the service provider operating the call processing system $20$ for charges incurred by these multiple persons and/or multiple communication devices, thereby simplifying a billing process for both the service provider and a subscriber receiving this single consolidated bill.

Figure 2:
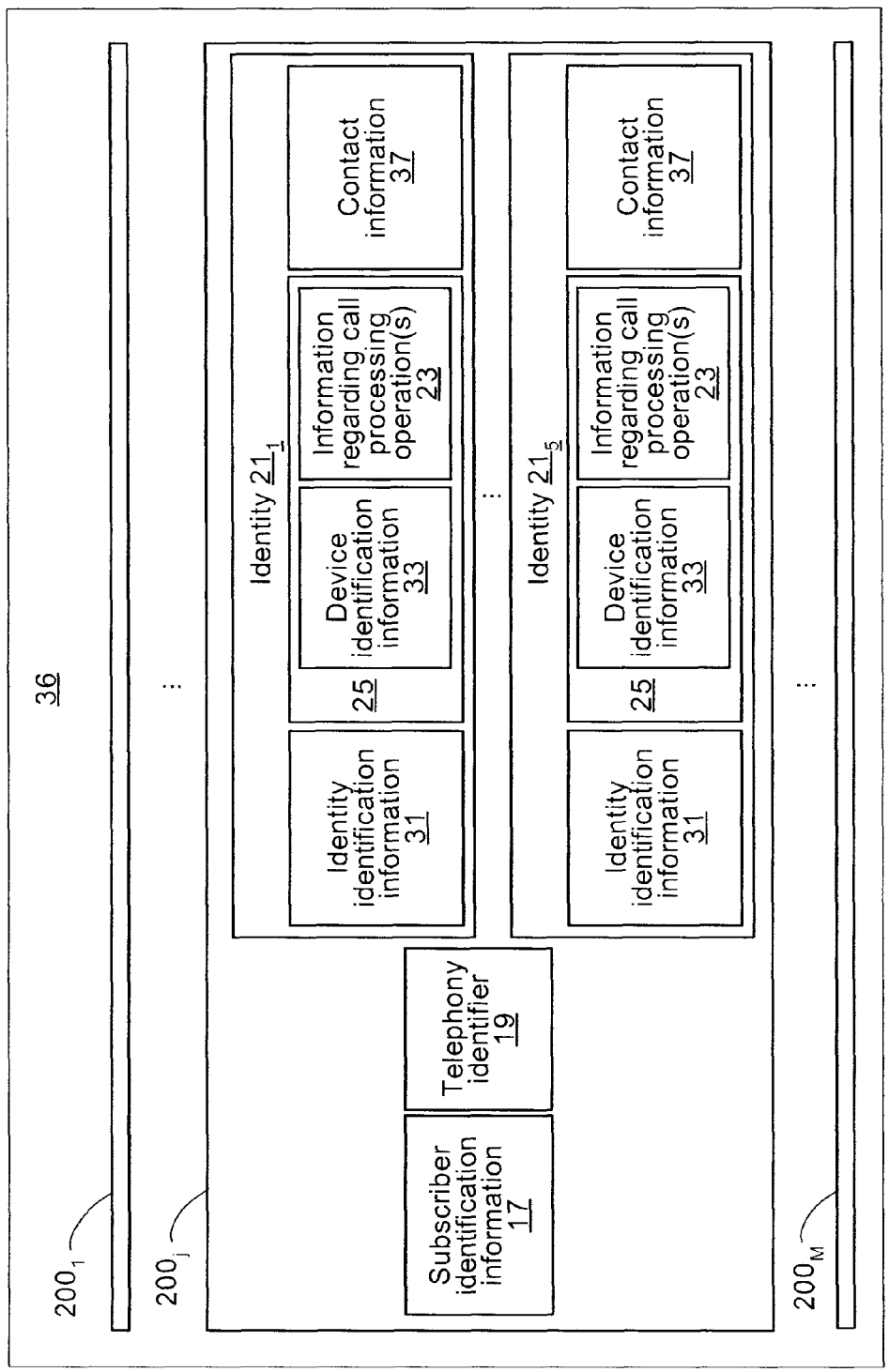
FIG. 2 shows an example of potential contents of a database of the call processing system.

An association of a telephone number or other telephony identifier with a group of identities may be maintained in the database $36$. FIG. 2 shows an example of potential contents of the database $36$. In this example, the database $36$ stores a plurality of records $200_1$-$200_M$, where each of the records $200_1$-$200_M$ is associated with a subscriber to communication services provided by the service provider operating the call processing system $20$.

For purposes of illustration, it is assumed that, in this example, a record $200_j$ of the records $200_1$-$200_M$ is associated with the family formed by the users $12_1 \ldots 12_4$.

In this embodiment, the record $200_j$ includes subscriber identification information $17$ identifying the subscriber associated with the record $200_j$. For instance, the subscriber identification information $17$ may include an account number and/or another subscriber identifier.

The record $200_j$ also includes a telephony identifier $19$ enabling establishment of calls. In this embodiment, the telephony identifier $19$ is a telephone number, which, for purposes of this example, is assumed to be (555) 555-1234. In other embodiments, the telephony identifier $19$ may be any other information that can be provided by a calling party and/or used by the communications network $10$ when a call is to be established (e.g., a name, an electronic serial number (ESN), an IP address, a SIP URI, Electronic Numbering (ENUM) information, etc.).

In this example, the telephone number $19$ is associated with a group of identities $21_1 \ldots 21_5$. In this case, each of the identities $21_1 \ldots 21_5$ designates a person, namely, one of the users $12_1 \ldots 12_4$. More particularly, in this example: each of the identities $21_1$ and $21_2$ designates the user $12_1$ (i.e., the father), where the identity $21_1$ is a personal identity of the user $12_1$ used for his personal life and the identity $21_2$ is a business identity of the user $12_1$ used for business purposes; the identity $21_3$ designates the user $12_2$ (i.e., the mother); the identity $21_4$ designates the user $12_3$ (i.e., the son); and the identity $21_5$ designates the user $12_4$ (i.e., the daughter).

As further discussed later on, when it operates to establish a call placed to the telephone number $19$ (in this case, (555) 555-1234) by a calling party, the call processing system $20$ determines, based on information regarding an origin of the call (e.g., a telephone number or other identifier of the calling party, a time at which the call was originated, a location where the call was originated, etc.), to which of the identities $21_1 \ldots 21_5$ the call is intended for and proceeds to route the call accordingly, for instance, by directing the call to one or more of the communication devices $14_1 \ldots 14_8$.

Each of the identities $21_1 \ldots 21_5$ is associated with various information that effectively serves to define that identity within the call processing system $20$.

More particularly, in this embodiment, each of the identities $21_1 \ldots 21_5$ is identified by identity identification information $31$, which may include, for instance, a name (e.g., a name of a given one of the users $12_1 \ldots 12_4$ designated by that identity), an identity number or code, and/or other information identifying that identity.

Also, each of the identities $21_1 \ldots 21_5$ is associated with information $25$ related to processing of calls involving that identity, i.e., calls intended for or originated by the person designated by that identity. The information $25$ associated with each of the identities $21_1 \ldots 21_5$, which is hereinafter referred to as "call processing information", is used by the call processing system $20$ to process a call intended for or originated by that identity.

In this embodiment, the call processing information $25$ associated with each of the identities $21_1 \ldots 21_5$ comprises device identification information $33$ directly or indirectly identifying one or more of the communication devices $14_1 \ldots 14_8$ associated with that identity. More particularly, the person designated by each of the identities $21_1 \ldots 21_5$ may be associated with one or more of the communication devices $14_1 \ldots 14_8$ that he/she is expected to use for effecting calls. Thus, in this example: the identity $21_1$ (which designates the user $12_1$, and more specifically, his personal identity) is associated with the communication devices $14_1 \ldots 14_4$; the identity $21_2$ (which designates the user $12_1$, and more specifically, his business identity) is associated with the communication devices $14_1$ and $14_2$; the identity $21_3$ (which designates the user $12_2$) is associated with the communication devices $14_3$ and $14_4$; the identity $21_4$ (which designates the user $12_3$) is associated with the communication devices $14_3$, $14_5$ and $14_7$; and the identity $21_5$ (which designates the user $12_4$) is associated with the communication devices $14_3$, $14_6$ and $14_8$.

In order to reach or be reached by the call processing system $20$ over the communications network $10$, each of the communication devices $14_1 \ldots 14_8$ is directly or indirectly identified by a device identifier included in the device identification information $33$. The device identifier identifying each of the communication devices $14_1 \ldots 14_8$ may take on various forms depending on that communication device's type. For example: for the communication device $14_1$, which, in this case, is a wired POTS phone, the device identifier may include a telephone number identifying a telephone line to which the wired POTS phone $14_1$ is connected; for the communication device $14_2$, which, in this case, is a wireless phone, the device identifier may include an electronic serial number (ESN) and/or a telephone number associated with the wireless phone $14_2$; for each of the communication devices $14_3 \ldots 14_6$, each of which is, in this case, a VoIP phone, ATA-equipped POTS phone, or softphone, the device identifier may include an IP address and/or a telephone number (and/or another URI such as a SIP URI) associated with the VoIP phone, ATA-equipped POTS phone, or softphone. It will be recognized that the device identifier identifying a given communication device may take on other forms (e.g., Electronic Numbering (ENUM) information) in other cases.

In this example, callers who desire to reach the users $12_1 \ldots 12_4$ can do so by placing calls to the telephone number $19$ (in this case, (555) 555-1234) without knowing the device identifier associated with any of the communication devices $14_1 \ldots 14_8$. In that sense, the device identifier associated with each of the communication devices $14_1 \ldots 14_8$ can be viewed as a "hidden" identifier (e.g., a hidden telephone number) that is used by the call processing system $20$ to communicate with that communication device. That is, the device identifier associated with each of the communication devices $14_1 \ldots 14_8$ need not be known by callers that call the users $12_1 \ldots 12_4$ or even by the users $12_1 \ldots 12_4$ themselves. Rather, the users $12_1 \ldots 12_4$ may provide only the telephone number 19, in this case, (555) 555-1234, to individuals (e.g., friends, colleagues, business contacts or other acquaintances) who may then proceed to call any one of the users $12_1 \ldots 12_4$ using that telephone number. As further discussed later on, the call processing system 20 can determine, based on information regarding an origin of a given call placed to the telephone number (555) 555-1234, to which of the identities $21_1 \ldots 21_5$ the call is intended for and can then proceed to route the call accordingly, for instance, by directing the call to one or more of the communication devices $14_1 \ldots 14_8$ using the (hidden) device identifier associated with each of these communication devices.

In this embodiment, the call processing information 25 associated with each of the identities $21_1 \ldots 21_5$ also comprises information 23 regarding one or more operations to be performed by the call processing system 20 to process calls intended for or originated by that identity. This information 23, which is hereinafter referred to as "processing operation information", can take on many forms in various embodiments. For example, in some embodiments, the processing operation information 23 associated with each of the identities $21_1 \ldots 21_5$ can be viewed as defining a set of one or more rules that may be characterized by various levels of complexity. For instance, in some cases, the processing operation information 23 associated with a given one of the identities $21_1 \ldots 21_5$ may simply specify to route a call determined to be intended for that identity to one or more communication devices (e.g., any one of the communication devices $14_1 \ldots 14_8$), while, in other cases, it may specify a more complex set of rules to be applied when a call is determined to be intended for or originated by that identity (e.g., based on an origin of the call, a time at which it is originated, etc.).

The processing operation information 23 associated with each of the identities $21_1 \ldots 21_5$ may be configurable in order to allow processing of calls intended for or originated by the person designated by that identity as desired by that person. In some embodiments, the processing operation information 23 associated with each of the identities $21_1 \ldots 21_5$ may be configured by the person designated by that identity during a provisioning phase (e.g., via a data network site operated by the service provider operating the call processing system 20).

For instance, in some embodiments, the processing operation information 23 associated with each of the identities $21_1 \ldots 21_5$ may relate to zero or more telephony features that may be subscribed to by the person designated by that identity. Subscription to different telephony features may be completely independent from one person to another and there is no restriction on a number or combination of features that may be subscribed to by any one person. In some cases, a person may not subscribe to any telephony feature, while in other cases a person may subscribe to all available telephony features. Also, in some cases, one or more telephony features may be subscribed to without having to pay for these one or more features, which may be provided as default or standard features.

Examples of telephony features that may be subscribed to by the person designated by an identity $21_j$ of the identities $21_1 \ldots 21_5$ include:

- a call forwarding feature whereby every incoming call determined to be intended for the identity $21_j$ is to be forwarded to a particular communication device (e.g., any one of the communication devices $14_1 \ldots 14_8$) associated with a particular device identifier (e.g., a telephone number, IP address, or SIP URI), in which case the processing operation information 23 may include the particular device identifier and possibly other information (e.g., one or more periods of time during which this feature is to be applied);
- a selective call forwarding feature whereby an incoming call determined to be intended for the identity $21_j$ and originated by any of one or more communication devices each associated with a predetermined identifier (e.g., a predetermined telephone number, IP address, or SIP URI) is to be forwarded to a particular communication device (e.g., any one of the communication devices $14_1 \ldots 14_8$) associated with a particular device identifier (e.g., a telephone number, IP address, or SIP URI), in which case the processing operation information 23 may include the predetermined identifier associated with each of the one or more communication devices, the particular device identifier and possibly other information (e.g., one or more periods of time during which this feature is to be applied);
- a no-answer call forwarding feature whereby an incoming call determined to be intended for the identity $21_j$ is to be forwarded to a particular communication device (e.g., any one of the communication devices $14_1 \ldots 14_8$) associated with a particular device identifier (e.g., a telephone number, IP address, or SIP URI) if it is not answered within a predetermined period of time (e.g., a predetermined number of rings), in which case the processing operation information 23 may include the particular device identifier, the predetermined period of time, and possibly other information (e.g., one or more periods of time during which this feature is to be applied);
- a "find me/follow me" (FM/FM) call forwarding feature whereby an incoming call determined to be intended for the identity $21_j$ is to be forwarded to a plurality of communication devices (e.g., plural ones of the communication devices $14_1 \ldots 14_8$) respectively associated with a plurality of identifiers (each of which may be, for example, a telephone number, IP address, or SIP URI) either simultaneously and/or sequentially (e.g., until it is answered or all the identifiers have been used and the call remains unanswered, in which case it can be forwarded to a voicemail system), in which case the processing operation information 23 may include the plurality of identifiers, a sequence in which they are to be used or an indication to use all or some of them simultaneously, and possibly other information (e.g., one or more periods of time during which this feature is to be applied, one or more identifiers associated with one or more communication devices originating calls to which this feature is to be applied, etc.);
- a distinctive ringing feature whereby incoming calls determined to be intended for the identity $21_j$ are to be announced by different audio signals (e.g., ring tones or songs) when they originate from communication devices associated with specific identifiers (each of which may be, for example, a telephone number, IP address, or SIP URI), in which case the processing operation information 23 may include, for each of the communication devices, the specific identifier associated therewith, information regarding a specific audio signal to be produced when an incoming call originates therefrom, and possibly other information (e.g., one or more periods of time during which this feature is to be applied);

a selective call rejection feature whereby an incoming call determined to be intended for the identity $21_j$ and originated by any of one or more communication devices each associated with a predetermined identifier (e.g., a predetermined telephone number, IP address, or SIP URI) is rejected and not announced, in which case the processing operation information 23 may include the predetermined identifier associated with each of the one or more communication devices and possibly other information (e.g., one or more periods of time during which this feature is to be applied);

a selective call acceptance feature whereby only an incoming call determined to be intended for the identity $21_j$ and originated by any of one or more communication devices each associated with a predetermined identifier (e.g., a predetermined telephone number, IP address, or SIP URI) is accepted and announced, in which case the processing operation information 23 may include the predetermined identifier associated with each of the one or more communication devices and possibly other information (e.g., one or more periods of time during which this feature is to be applied);

a call waiting feature whereby a communication device (e.g., any one of the communication devices $14_1 \ldots 14_8$) involved in a call in progress produces a notification of an incoming call determined to be intended for the identity $21_j$, in which case the processing operation information 23 may include an indication that this feature is to be applied, information regarding an audio notification to be produced to announce an incoming call, and possibly other information (e.g., one or more periods of time during which this feature is to be applied);

a distinctive ringing call waiting feature whereby a communication device (e.g., any one of the communication devices $14_1 \ldots 14_8$) involved in a call in progress produces a distinctive audio notification of an incoming call determined to be intended for the identity $21_j$ and originated by any of one or more communication devices each associated with a specific identifier (e.g., a specific telephone number, IP address, or SIP URI), in which case the processing operation information 23 may include, for each of the one or more communication devices, the specific identifier associated therewith, information regarding an audio notification to be produced to announce an incoming call originated therefrom, and possibly other information (e.g., one or more periods of time during which this feature is to be applied);

a calling line identification (CLID) displaying feature whereby CLID information (e.g. a telephone number and/or a name) associated with a communication device originating a call determined to be intended for the identity $21_j$ is displayed, in which case the processing operation information 23 may include an indication that this feature is to be applied and possibly other information (e.g., one or more periods of time during which this feature is to be applied);

a CLID blocking feature whereby CLID information (e.g., a telephone number and/or a name) is not provided to a communication device when an outgoing call for that communication device is determined to be originated by the identity $21_j$, in which case the processing operation information 23 may include an indication that this feature is to be applied and possibly other information (e.g., one or more periods of time during which this feature is to be applied);

a speed calling feature whereby an outgoing call determined to be originated by the identity $21_j$ and destined for any of one or more communication devices each associated with a predetermined telephone number can be originated by inputting a specific code (e.g., a one or two digit code) shorter than the predetermined telephone number, in which case the processing operation information 23 may include, for each of the one or more communication devices, the predetermined telephone number associated therewith, the specific code, and possibly other information (e.g., one or more periods of time during which this feature is to be applied); and an outgoing call barring feature whereby an outgoing call determined to be originated by the identity $21_j$ and destined for any of one or more communication devices each associated with a predetermined identifier (e.g., a predetermined telephone number, IP address, or SIP URI) is to be prevented from being established, in which case the processing operation information 23 may include, for each of the one or more communication devices, the predetermined identifier associated therewith and possibly other information (e.g., one or more periods of time during which this feature is to be applied).

It is to be understood that these examples of telephony features are presented for illustrative purposes only and are not to be considered limiting in any respect as various other telephony features are or may become available. Also, the above examples of information that may be part of the processing operation information 23 associated with the identity $21_j$, in relation to one or more telephony features are presented for illustrative purposes only and are not to be considered limiting in any respect.

It is also to be understood that, in some embodiments, the processing operation information 23 associated with any one of the identities $21_1 \ldots 21_5$ may not relate to any particular telephony feature. Generally, the processing operation information 23 associated with each of the identities $21_1 \ldots 21_5$ is indicative of one or more operations to be performed by the call processing system 20 to process calls intended for or originated by that identity.

In this embodiment, each of the identities $21_1 \ldots 21_5$ may also be associated with contact information 37 regarding one or more contacts (e.g., friends, colleagues, business contacts or other acquaintances) of the person designated by that identity. For example, for each of these one or more contacts, the contact information 37 may include a telephony identifier associated with that party, such as a telephone number, a name, an electronic serial number (ESN), an IP address, a SIP URI, Electronic Numbering (ENUM) information, etc. Thus, in this case, the contact information 37 associated with each of the identities $21_1 \ldots 21_5$ can be viewed as part of an address book of the person designated by that identity. The contact information 37 associated with each of the identities $21_1 \ldots 21_5$ may be configured by the person designated by that identity during a provisioning phase (e.g., via a data network site operated by the service provider operating the call processing system 20).

While in this embodiment the database 36 includes certain information in connection with each of the identities $21_1 \ldots 21_5$, the database 36 may include various other information in other embodiments. Also, while in this example each of the identities $21_1 \ldots 21_5$ designates a single one of the users $12_1 \ldots 12_4$, in other examples, the telephone number 19 may be associated with an additional identity designating two or more of the users $12_1 \ldots 12_4$. For instance, in some cases, in addition to being associated with the identities $21_1 \ldots 21_5$, the telephone number 19 may be associated with an additional identity designating the family formed by the users $12_1 \ldots 12_4$.

Also, while in this example the record $200_j$ associates the telephone number 19 (in this case, (555) 555-1234) with the group of identities $21_1 \ldots 21_5$, it will be appreciated that, in some embodiments, one or more of the records $200_1$-$200_M$ in the database 36 may include a telephony identifier 19 that is not associated with a group of identities, but that is rather generally associated with a subscriber to communication services provided by the service provider operating the call processing system 20 without defining two or more identities.

In addition, while it is depicted in FIG. 1 as being one component, the database 36 may be distributed in nature. For example, the database 36 can have portions of its content stored in different data storage media possibly located in different network components of the communications network 10.

Figure 3:
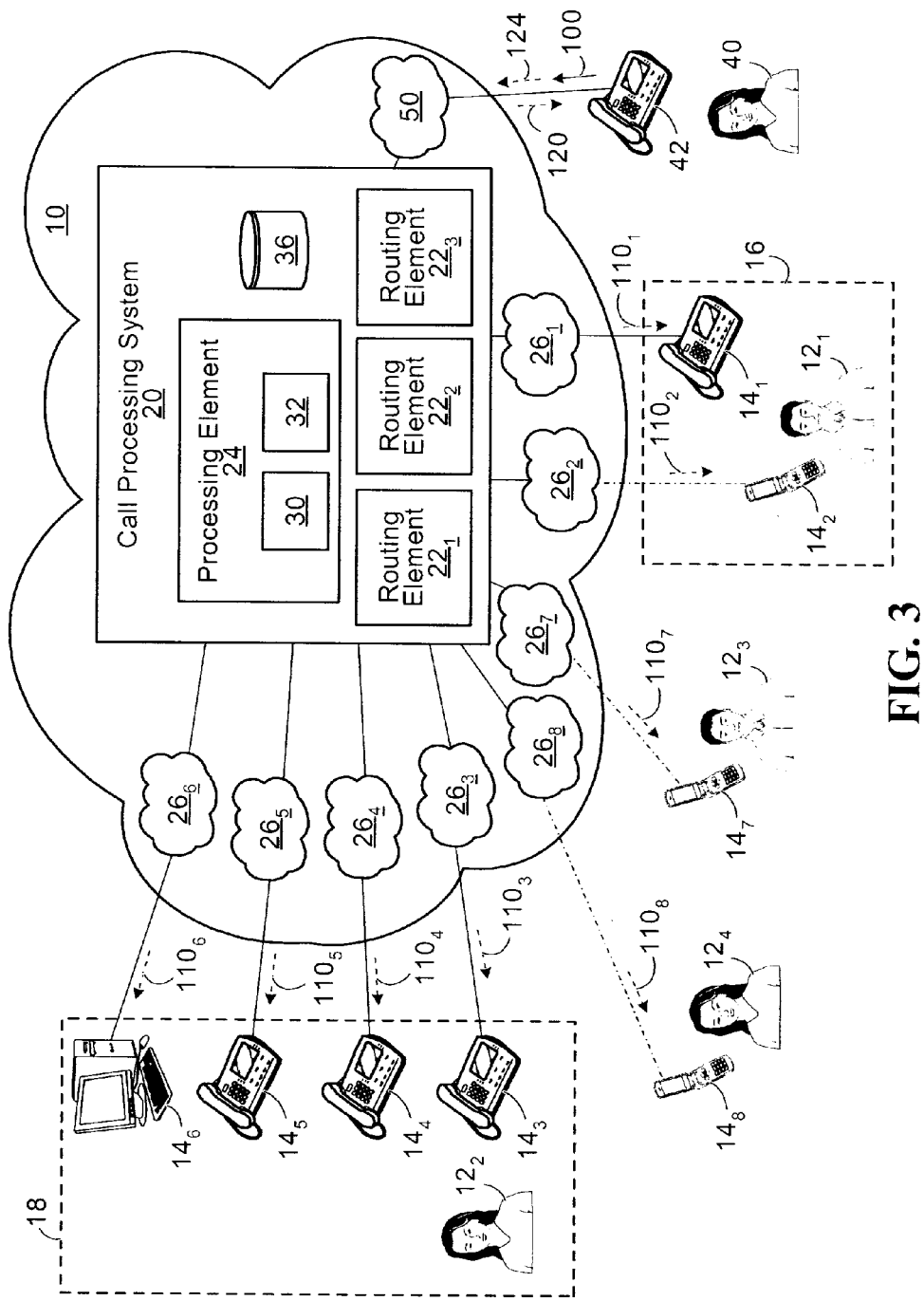
FIG. 3 shows an example of signals potentially exchanged between the call processing system and various communication devices over the communications network.

Referring now to FIG. 3, operation of the call processing system 20, and in particular of the processing element 24, will be illustrated in the context of an example in which a calling party 40 uses a communication device 42 for placing a call to the telephone number 19, in this case, (555) 555-1234, associated with the group of identities $21_1 \ldots 21_5$ designating the users $12_1 \ldots 12_4$. In various embodiments, the communication device 42 may be a wired POTS phone, a wireless phone, a VoIP phone, an ATA-equipped POTS phone, a softphone, a telephony-enabled television unit, or any other suitable communication device.

For example, the calling party 40 may interact with the communication device 42 to dial the telephone number (555) 555-1234, select a contact identifier from a contact function implemented by the communication device 42 to indicate his/her desire to call that telephone number, or speak a voice command indicative of his/her desire to call that telephone number. This interaction of the calling party 40 with the communication device 42 results in the communication device 42 transmitting a signal 100 over a network portion 50 of the communications network 10 (e.g., a telephone line in the PSTN, a wireless link in combination with a base station and a wireline link, a digital communications link, and/or one or more other network components (e.g., routing elements, gateways, etc.)). The signal 100, which travels to the call processing system 20, serves to place the call to the telephone number (555) 555-1234. For example, and depending on the nature of the network portion 50 and the nature of the interaction of the calling party 40 with the communication device 42, the signal 100 may convey one or more dual-tone multi-frequency (DTMF) tones, one or more data packets, or other information serving to place the call for the telephone number (555) 555-1234.

In the call processing system 20, the signal 100 is eventually processed by the processing element 24 (possibly after being processed by one or more other elements of the call processing system 20 such as, for instance, one or more of the routing elements $22_1 \ldots 22_3$). As part of this process, the processing entity 30 determines that the signal 100 originates from the communication device 42 and serves to place the call to the telephone number (555) 555-1234. More particularly, the processing entity 30 obtains, based on the signal 100, information regarding an origin of the call and information indicating that the call has been placed to the telephone number (555) 555-1234. For instance, in this embodiment, the information regarding the origin of the call is indicative of a telephone number identifying the communication device 42, which, for purposes of this example, is assumed to be (555) 555-5678, and of a time at which the call was originated (e.g., a day, hour, minute, etc.).

As it carries out its call processing logic, the processing entity 30 consults the database 36 to determine whether certain actions are to be performed in respect of the call placed to the telephone number (555) 555-1234. Thus, in this example, the processing entity 30 consults the database 36 in an attempt to find a given one of the record. $200_1$-$200_M$ that includes a telephony identifier 19 corresponding to the telephone number (555) 555-1234. In this case, upon finding the record $200_j$ which corresponds to the telephone number (555) 555-1234, the processing entity 30 determines that this telephone number is associated with the group of identities $21_1 \ldots 21_5$.

The processing entity 30 proceeds to determine for which of the identities $21_1 \ldots 21_5$ the call placed to the telephone number (555) 555-1234 is intended and then causes the call to be routed accordingly, for instance, by causing the call to be directed to one or more of the communication devices $14_1 \ldots 14_8$. In this embodiment, the processing entity 30 determines, based on the information regarding the origin of the call placed to the telephone number (555) 555-1234, at least one particular identity of the identities $21_1 \ldots 21_5$ for which the call is intended, and proceeds to cause routing of the call based on the call processing information 25 associated with the at least one particular identity of the identities $21_1 \ldots 21_5$.

More particularly, in this embodiment, the processing entity 30 searches the record $200_j$ to determine whether the telephone number (555) 555-5678, from which originates the call placed to the telephone number (555) 555-1234, is part of the contact information 37 associated with any one of the identities $21_1 \ldots 21_5$. Different scenarios that can arise will now be discussed.

Scenario I: Originating Telephone Number is Part of Contact Information Associated with a Single Identity If the telephone number (555) 555-5678 is part of the contact information 37 associated with a single one of the identities $21_1 \ldots 21_5$, the processing entity 30 concludes that the call placed to the telephone number (555) 555-1234 is intended for that identity.

In this case, the processing entity 30 proceeds to cause the routing entity 32 to effect routing of the call based on the call processing information 25 associated with the single one of the identities $21_1 \ldots 21_5$. For instance, based on the call processing information 25 associated with the single one of the identities $21_1 \ldots 21_5$, the routing entity 32 may cause one or more of the routing elements $22_1 \ldots 22_3$ to send one or more signals $110_1 \ldots 110_8$ over one or more of the network portions $26_1 \ldots 26_8$ to route the call to one or more of the communication devices $14_1 \ldots 14_8$, and/or may cause the call to be routed in other ways (e.g., to a voicemail system). While the call is being routed, the routing entity 32 may cause the communication device 42 to provide a ring back tone (e.g., a standard or other audible tone or sound file) to indicate to the calling party 40 that the call is being placed.

For example, assume that (i) the single one of the identities $21_1 \ldots 21_5$ is the identity $21_2$ (which is the business identity of the user $12_1$, i.e., the father), and (ii) the call processing information 25 associated with the identity $21_2$ indicates that any call (or any call originating from one or more predetermined telephone numbers, including the telephone number (555) 555-5678) intended for the identity $21_2$ and originated on weekdays between 8:00 AM and 5:00 PM is to be routed to the communication device $14_1$ (i.e., the wired POTS phone at the workplace 16 of the user $12_1$) and that any call intended for the identity $21_2$ at any other time is to be routed to the communication device $14_2$ (i.e., the wireless phone of the user $12_1$). Thus, in a case where the call placed to the telephone number (555) 555-1234 was originated at 2:30 PM on a Tuesday, the routing entity 32 causes the routing element $22_1$ to send a signal $110_1$ over the network portion $26_1$ to route the call to the communication device $14_1$, while in a case where the call was originated at 10:30 AM on a Saturday, the routing entity 32 causes the routing element $22_1$ to send a signal $110_2$ over the network portion $26_2$ to route the call to the communication device $14_2$.

As another example, assume that (i) the single one of the identities $21_1 \ldots 21_5$ is the identity $21_1$ (which is the personal identity of the user $12_1$, i.e., the father), and (ii) the call processing information 25 associated with the identity $21_1$ indicates that any call intended for the identity $21_1$ and originated on weekdays between 7:00 AM and 6:00 PM is to be routed to the communication device $14_2$ (i.e., the wireless phone of the user $12_1$) and that any call intended for the identity $21_1$ at any other time is to be routed to each of the communication devices $14_3$ and $14_4$ (i.e., the VoIP phone and the ATA-equipped POTS phone in the kitchen and the parents-bedroom of the residence 18, respectively). Thus, in a case where the call placed to the telephone number (555) 555-1234 was originated at 1:40 PM on a Tuesday, the routing entity 32 causes the routing element $22_2$ to send a signal $110_2$ over the network portion $26_2$ to route the call to the communication device $14_2$, while in a case where the call was originated at 8:00 PM on a Monday, the routing entity 32 causes the routing element $22_3$ to send signals $110_3$ and $110_4$ over the network portions $26_3$ and $26_4$ to route the call to the communication devices $14_3$ and $14_4$.

As yet another example, assume that (i) the single one of the identities $21_1 \ldots 21_5$ is the identity $21_4$ (which designates the user $12_3$, i.e., the son), and (ii) the call processing information 25 associated with the identity $21_4$ indicates that any call intended for the identity $21_4$ is to be first routed to the communication device $14_5$ (i.e., the VoIP phone in the son's bedroom at the residence 18) and, if not answered within a certain period of time (e.g., a certain number of rings), then routed to the communication device $14_7$ (i.e., the wireless phone of the user $12_3$). Thus, the routing entity 32 causes the routing element $22_3$ to send a signal $110_5$ over the network portion $26_5$ to route the call to the communication device $14_5$ and, if the call is not answered within the certain period of time, the routing entity 32 causes the routing element $22_2$ to send a signal $110_7$ over the network portion $26_7$ to route the call to the communication device $14_7$.

As yet another example, assume that (i) the single one of the identities $21_1 \ldots 21_5$ is the identity $21_3$ (which designates the user $12_2$, i.e., the mother), and (ii) the call processing information 25 associated with the identity $21_3$ indicates that any call intended for the identity $21_3$ is to be routed to each of the communication devices $14_3$ and $14_4$ (i.e., the VoIP phone and the ATA-equipped POTS phone in the kitchen and the parents' bedroom of the residence 18, respectively). Thus, in that case, the routing entity 32 causes the routing element $22_3$ to send signals $110_3$ and $110_4$ over the network portions $26_3$ and $26_4$ to route the call to the communication devices $14_3$ and $14_4$.

It will be appreciated that these examples are presented for illustrative purposes only and that the routing entity 32 may cause the call placed to the telephone number (555) 555-1234 to be routed in various manners depending on the call processing information 25 associated with the single one of the identities $21_1 \ldots 21_5$ for which the call is determined to be intended (e.g., the routing entity 32 may cause one or more actions to be performed in relation to one or more telephony features that may be subscribed to by the person designated by that identity).

It will also be appreciated that, in cases where the routing entity 32 causes the call placed to the telephone number (555) 555-1234 to be routed to a given one of the communication devices $14_1 \ldots 14_8$ that is associated with two or more of the identities $21_1 \ldots 21_5$ (e.g., the communication device $14_3$ or $14_4$), the routing entity 32 may cause that given communication device to indicate which one of these identities the call is intended for. For example, the routing entity 32 may cause the given communication device to provide an audible indication (e.g., a distinctive ringtone and/or a voice announcement) and/or a visual indication (e.g., a displayed announcement, which may be combined with CLID information, and/or lighting up of a light) of which one of these identities the call is intended for.

Scenario II: Originating Telephone Number is Part of Contact Information Associated with Two or More Identities If the telephone number (555) 555-5678 is part of the contact information 37 associated with each of two or more of the identities $21_1 \ldots 21_5$, the processing entity 30 concludes that the call placed to the telephone number (555) 555-1234 is intended for at least one of these two or more identities.

In some embodiments, upon concluding that the call placed to the telephone number (555) 555-1234 is intended for at least one of two or more of the identities $21_1 \ldots 21_5$, the processing entity 30 may cause the routing entity 32 to effect routing of the call based on the call processing information 25 associated with each of these two or more identities. For instance, based on the call processing information 25 associated with the two or more of the identities $21_1 \ldots 21_5$, the routing entity 32 may cause one or more of the routing elements $22_1 \ldots 22_3$ to send one or more signals $110_1 \ldots 110_8$ over one or more of the network portions $26_1 \ldots 26_8$ to route the call to one or more of the communication devices $14_1 \ldots 14_8$, and/or may cause the call to be routed in other ways (e.g., to a voicemail system). For example, in a case where the telephone number (555) 555-5678 is part of the contact information 37 associated with each of the identities 21, and $21_3$, which respectively designate the user $12_1$, (i.e., the father) and the user $12_2$, (i.e., the mother), the routing entity 32 may cause the routing element $22_3$ to send signals $110_3$ and $110_4$ over the network portions $26_3$ and $26_4$ to route the call to the communication devices $14_3$ and $14_4$.

Alternatively, in some embodiments, upon concluding that the call placed to the telephone number (555) 555-1234 is intended for at least one of two or more of the identities $21_1 \ldots 21_5$, the processing entity 30 may attempt to single out a specific one of these two or more identities as being more likely to be the identity for which the call is intended.

For example, in some embodiments, the processing entity 30 may consult a call history in an attempt to single out a specific identity for which the call is intended. The call history may be included in the record $200_j$, of the database 36 or in another database to which the processing entity 30 has access. In some cases, the call history may indicate which of the identities $21_1 \ldots 21_5$ effectively answered previous calls placed to the telephone number (555) 555-1234 from various origins (e.g., various origination telephone numbers). For instance, this can be achieved by indicating which of the communication devices $14_1 \ldots 14_8$ have been used to answer these previous calls or using other techniques to flag incoming calls as having been answered by one of the identities $21_1 \ldots 21_5$. Upon consulting the call history, the processing entity 30 may determine that a specific one of the two or more of the identities $21_1 \ldots 21_5$, which are associated with the contact information 37 that includes the telephone number (555) 555-5678, has been involved in answering most or all of the previous calls originating from that telephone number or the last call originating from that telephone number, in which case the processing entity 30 may conclude that the call placed to the telephone number (555) 555-1234 is intended for that specific identity. In other cases, the call history may indicate which of the identities $21_1 \ldots 21_5$ effectively placed previous calls to various destinations (e.g., various destination telephone numbers). For instance, this can be achieved by indicating which of the communication devices $14_1 \ldots 14_8$ have been used to place these previous calls or using other techniques to flag outgoing calls as having been placed by one of the identities $21_1 \ldots 21_5$. Upon consulting the call history, the processing entity 30 may determine that a specific one of the two or more of the identities $21_1 \ldots 21_5$, which are associated with the contact information 37 that includes the telephone number (555) 555-5678, has been involved in placing most or all of the previous calls to that telephone number or the last call placed to that telephone number, in which case the processing entity 30 may conclude that the call placed to the telephone number (555) 555-1234 is intended for that specific identity. In these cases, the processing entity 30 may cause the routing entity 32 to effect routing of the call based on the call processing information 25 associated with the specific one of the identities $21_1 \ldots 21_5$, in a manner similar to that described above in respect of Scenario I.

As another example, in some embodiments, the processing entity 30 may cause transmission of a signal 120 to the communication device 42 in order to invite the calling party 40 to specify which of the identities $21_1 \ldots 21_5$ he/she is trying to reach. For example, the signal 120 may convey a message inviting the calling party 40 to specify which of the identities $21_1 \ldots 21_5$ he/she is trying to reach. Depending on functionality of the communication device 42, the message may comprise a voice message and/or a displayable message prompting the calling party 40 to specify which of the identities $21_1 \ldots 21_5$ he/she is trying to reach. For instance, in a case where the processing entity 30 concluded that the call placed to the telephone number (555) 555-1234 is intended for at least one of the identities $21_1$ and $21_3$ and where the user $12_1$ is named John and the user $12_2$ is named Carol, the message may be "Are you trying to reach John or Carol?", "Press 1 if you want to reach John, 2 if you want to reach Carol, or 3 if you want to reach either of them", or any conceivable variant thereof. Alternatively, the message may be "Please specify who you are trying to reach" or any conceivable variant thereof such as to not give out the names of John and Carol. The calling party 40 may then interact with the communication device 42, for instance, by pressing on one or more buttons or otherwise manually interacting therewith and/or speaking one or more utterances in order to specify which of the identities $21_1 \ldots 21_5$ he/she is trying to reach, thereby causing the communication device 42 to transmit a signal 124 indicative of which of the identities $21_1 \ldots 21_5$ the calling party 40 is trying to reach. Upon processing the signal 124 indicative of which of the identities $21_1 \ldots 21_5$ the calling party 40 is trying to reach (possibly applying a speech recognition function in a case where the calling party 40 vocally specified which identity he/she is trying to reach), the processing entity 30 concludes that the call placed to the telephone number (555) 555-1234 is intended for that specified identity. In such a case, the processing entity 30 may cause the routing entity 32 to effect routing of the call based on the call processing information 25 associated with the specified one of the identities $21_1 \ldots 21_5$, in a manner similar to that described above in respect of Scenario I.

Scenario III: Originating Telephone Number is not Part of Contact Information Associated with any Identity If the telephone number (555) 555-5678 is not part of the contact information 37 associated with any of the identities $21_1 \ldots 21_5$, the processing entity 30 concludes that the call placed to the telephone number (555) 555-1234 is intended for an undetermined one of these identities.

In some embodiments, upon concluding that the call placed to the telephone number (555) 555-1234 is intended for an undetermined one of the identities $21_1 \ldots 21_5$, the processing entity 30 may cause the routing entity 32 to effect routing of the call based on the call processing information 25 associated with each of these identities. For instance, based on the call processing information 25 associated with each of the identities $21_1 \ldots 21_5$, the routing entity 32 may cause one or more of the routing elements $22_1 \ldots 22_3$ to send one or more signals $110_1 \ldots 110_8$ over one or more of the network portions $26_1 \ldots 26_8$ to route the call to one or more of the communication devices $14_1 \ldots 14_8$, and/or may cause the call to be routed in other ways (e.g., to a voicemail system). For example, in some cases, the routing entity 32 may cause the routing elements $22_1 \ldots 22_3$ to send signals $110_1 \ldots 110_8$ over the network portions $26_1 \ldots 26_8$ to route the call to each of the communication devices $14_1 \ldots 14_8$, either simultaneously or in a particular sequence.

Alternatively, in some embodiments, upon concluding that the call placed to the telephone number (555) 555-1234 is intended for an undetermined one of the identities $21_1 \ldots 21_5$, the processing entity 30 may attempt to single out a specific one of these identities as being more likely to be the identity for which the call is intended.

For example, in some embodiments, the processing entity 30 may consult the call history described above in connection with Scenario II. In some cases, upon consulting the call history, the processing entity 30 may determine that a specific one of the identities $21_1 \ldots 21_5$ has been involved in answering most or all of the previous calls originating from the telephone number (555) 555-5678 or the last call originating from that telephone number, in which case the processing entity 30 may conclude that the call placed to the telephone number (555) 555-1234 is intended for that specific identity. In other cases, upon consulting the call history, the processing entity 30 may determine that a specific one of the identities $21_1 \ldots 21_5$ has been involved in placing most or all of the previous calls to the telephone number (555) 555-5678 or the last call placed to that telephone number, in which case the processing entity 30 may conclude that the call placed to the telephone number (555) 555-1234 is intended for that specific identity. In these cases, the processing entity 30 may cause the routing entity 32 to effect routing of the call based on the call processing information 25 associated with the specific one of the identities $21_1 \ldots 21_5$, in a manner similar to that described above in respect of Scenario I.

As another example, in some embodiments, the processing entity 30 may cause transmission of a signal 120 to the communication device 42 in order to invite the calling party 40 to specify which of the identities $21_1 \ldots 21_5$ he/she is trying to reach, as described above in connection with Scenario II. The calling party 40 may then interact with the communication device 42, for instance, by pressing on one or more buttons or otherwise manually interacting therewith and/or speaking one or more utterances in order to specify which of the identities $21_1 \ldots 21_5$ he/she is trying to reach, thereby causing the communication device 42 to transmit a signal 124 indicative of which of the identities $21_1 \ldots 21_5$ the calling party 40 is trying to reach. Upon processing the signal 124 indicative of which of the identities $21_1 \ldots 21_5$ the calling party 40 is trying to reach (possibly applying a speech recognition function in a case where the calling party 40 vocally specified which identity he/she is trying to reach), the processing entity 30 concludes that the call placed to the telephone number (555) 555-1234 is intended for that specified identity. In such a case, the processing entity 30 may cause the routing entity 32 to effect routing of the call based on the call processing information 25 associated with the specified one of the identities $21_1 \ldots 21_5$, in a manner similar to that described above in respect of Scenario I.

As yet another example, in some embodiments, the processing entity 30 may access a public data network such as the Internet in order to determine whether there is a relationship between any one of the identities $21_1 \ldots 21_5$ and the origin of the call placed to the telephone number (555) 555-1234. More particularly, the processing entity 30 may perform a search on one or more sites (e.g., web sites) of the public data network on a basis of information regarding the origin of the call (e.g., the telephone number (555) 555-5678 identifying the communication device 42 and/or a name or other identifier of the calling party 40) and information pertaining to each of the identities $21_1 \ldots 21_5$ (e.g., a name of a given one of the users $12_1 \ldots 12_4$ designated by that identity) in order to determine whether there is a relationship between the origin of the call and any one of these identities. For example, the processing entity 30 may perform a search on one or more social networking sites (e.g., Facebook®, LinkedIn®, MySpace®) and/or one or more search engine sites (e.g., Google, Yahoo!). If, upon processing results of the search, the processing entity 30 determines that there is a relationship between the origin of the call and a given one of the identities $21_1 \ldots 21_5$ (e.g., a name of the calling party 40 has been found as a friend or contact in a social networking site profile of one of the users $12_1 \ldots 12_4$ designated by that given identity), the processing entity 30 may conclude that the call is intended for that given identity. In such a case, the processing entity 30 may cause the routing entity 32 to effect routing of the call based on the call processing information 25 associated with the given one of the identities $21_1 \ldots 21_5$, in a manner similar to that described above in respect of Scenario I.

While in embodiments considered above a determination as to which of the identities $21_1 \ldots 21_5$ the call placed to the telephone number (555) 555-1234 is intended for is effected in a particular manner, it will be appreciated that this determination may be effected in various other manners in other embodiments.

For example, and as mentioned previously, in some embodiments, in addition to being associated with the identities $21_1 \ldots 21_5$, the telephone number (555) 555-1234 may be associated with a sixth identity designating the family formed by the users $12_1 \ldots 12_4$. In these embodiments, the call processing information 25 associated with the identity designating the family formed by the users $12_1 \ldots 12_4$ may specify to route a call intended for the family to one or more common ones of the communication devices $14_1 \ldots 14_s$ (e.g. the communication device $14_3$ located in a common area of the residence 18) and, optionally, if the call remains unanswered after a predetermined period of time (e.g., a predetermined number of rings), to route the call to a voicemail system. For instance, upon encountering Scenario III described above where the telephone number (555) 555-5678 from which originates the call placed to the telephone number (555) 555-1234 is not part of the contact information 37 associated with any of the identities $21_1 \ldots 21_5$, the processing entity 30 may conclude, by default, that the call placed to the telephone number (555) 555-1234 is intended for the identity designating the family formed by the users $12_1 \ldots 12_4$ and may proceed to cause the routing entity 32 to effect routing of the call based on the call processing information 25 associated with the identity designating the family formed by the users $12_1 \ldots 12_4$, thereby causing the call to be routed to one or more common ones of the communication devices $14_1 \ldots 14_8$ and possibly to a voicemail system.

In addition, one or more other sources of information may be consulted by the processing entity 30 in making a determination as to which of the identities $21_1 \ldots 21_5$ a call placed to the telephone number (555) 555-1234 is intended for. For example, in some embodiments, the processing entity 30 may have access to one or more directories associated with one or more of the users $12_1 \ldots 12_4$ designated by the identities $21_1 \ldots 21_5$ (e.g., a corporate directory, a university directory, or another organization's directory) and may consult these one or more directories in an attempt to determine to which of the identities $21_1 \ldots 21_5$ a call placed to the telephone number (555) 555-1234 is intended for. For instance, in one case, further to provisioning of the identity $21_2$, i.e., the business identity of the user $12_1$, the processing entity 30 may have knowledge that the user $12_1$ works for a particular company and may have access to that company's directory. In this case, in determining to which of the identities $21_1 \ldots 21_5$ a given call placed to the telephone number (555) 555-1234 is intended for, the processing entity 30 may consult the directory of the particular company and, upon finding in the directory an origination telephone number and/or a calling party's name for the given call, may determine that the given call is intended for the identity $21_2$ and cause the given call to be routed accordingly.

Also, while in embodiments considered above the processing entity 30 can determine to which of the identities $21_1 \ldots 21_5$ a call placed to the telephone number (555) 555-1234 is intended for by consulting different sources of information, including the contact information 37 associated with each of these identities, a call history of previous calls, and one or more sites of a public data network, it will be appreciated that, in other embodiments, the processing entity 30 may effect this determination by consulting only one or a different combination of these sources of information or other sources of information.

It will thus be appreciated that, in this embodiment, the telephone number (555) 555-1234 being associated with the group of identities $21_1 \ldots 21_5$ which designate the users $12_1 \ldots 12_4$ is particularly useful from various perspectives. For example, in this case, the users $12_1 \ldots 12_4$ and the communication devices $14_1 \ldots 14_8$ share a common telephone number (i.e., (555) 555-1234) and every incoming call placed to that telephone number is routed according to which of the identities $21_1 \ldots 21_5$ it is determined to be intended for. This benefits the users $12_1 \ldots 12_4$ who only need to remember and give out to their friends, colleagues and/or other acquaintances a single telephone number (i.e., (555) 555-1234) at which they can be reached. Similarly, this benefits these friends, colleagues and/or other acquaintances of the users $12_1 \ldots 12_4$ who only need to remember a single telephone number (i.e., (555) 555-1234) at which each of the users $12_1 \ldots 12_4$ can be reached. Also, by virtue of routing every incoming call placed to the telephone number (555) 555-1234 according to which of the identities $21_1 \ldots 21_5$ it is determined to be intended for, undesirable situations where a given one of the users $12_1 \ldots 12_4$ for whom the call is n1ot intended wastes his/her time picking up the call can be avoided.

Those skilled in the art will appreciate that, in some embodiments, certain functionality of a given element described herein (e.g., the processing element 24) may be implemented as pre-programmed hardware or firmware components (e.g., application specific integrated circuits (ASICs), electrically erasable programmable read-only memories (EEPROMs), etc.) or other related components. In other embodiments, a given element described herein (e.g., the processing element 24) may comprise a processor having access to a memory which stores program instructions for operation of the processor to implement functionality of that given element. The program instructions may be stored on a data storage medium that is fixed, tangible, and readable directly by the given element. The data storage medium may store data optically (e.g., an optical disk such as a CD-ROM or a DVD), magnetically (e.g., a hard disk drive, a removable diskette), electrically (e.g., semiconductor memory, floating-gate transistor memory, etc.), or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A method for processing a call placed to a telephony identifier, said method comprising:
    obtaining an identifier of a calling party having originated the call;
    identifying a group of destination identities associated with the telephony identifier, each destination identity designating a party reachable by calling the telephony identifier;
    searching contact information respectively associated with the destination identities in the group of destination identities to identify a particular destination identity for which the respective contact information includes the identifier of the calling party having originated the call; and
    causing routing of the call based on information associated with the particular destination identity.

2. A method as claimed in claim 1, wherein the telephony identifier is a telephone number.

3. A method as claimed in claim 1, wherein the telephony identifier is a first telephony identifier and wherein the identifier of the calling party having originated the call comprises a second telephony identifier associated with a communication device from which the call originates.

4. A method as claimed in claim 3, wherein the second telephony identifier is a telephone number.

5. A method as claimed in claim 1, further comprising obtaining a time at which the call has been originated.

6. A method as claimed in claim 1, wherein the call is a current call and said determining comprises:
    consulting a call history of previous calls; and
    concluding from the call history and the identifier of the calling party having originated the current call that the current call is intended for the particular identity.

7. A method as claimed in claim 6, wherein said concluding comprises determining that the particular identity has been involved in answering at least one previous call placed to the telephony identifier and originating from the calling party having originated the current call.

8. A method as claimed in claim 6, wherein said concluding comprises determining that the particular identity has been involved in placing at least one previous call to a destination corresponding to the calling party having originated the current call.

9. A method as claimed in claim 1, said determining comprising:
    performing a search on at least one site of a data network on a basis of the identifier of the calling party having originated the call; and
    identifying, based on results of the search, a relationship between the particular identity and the calling party having originated the call.

10. A method as claimed in claim 9, wherein the at least one site comprises at least one of a social networking site and a search engine site.

11. A method as claimed in claim 1, wherein the information associated with the particular identity comprises information identifying a communication device associated with the particular identity, said causing routing of the call comprising causing routing of the call to the communication device.

12. A method as claimed in claim 11, wherein the information identifying the communication device associated with the particular identity comprises a hidden identifier identifying the communication device.

13. A method as claimed in claim 11, wherein said causing routing of the call comprises causing the communication device to present at least one of (1) an audible indication that the call is intended for the particular identity and (2) a visual indication that the call is intended for the particular identity.

14. A method as claimed in claim 13, wherein the audible indication comprises at least one of a distinctive sound and an audio message, and the visual indication includes at least one of a displayed message and a light being lit up.

15. A method as claimed in claim 13, wherein the visual indication comprises a displayed message within calling line identification information.

16. A method as claimed in claim 1, wherein the information associated with the particular identity comprises information indicative of at least one operation to perform to process calls intended for the particular identity.

17. A method as claimed in claim 16, wherein the information indicative of at least one operation to perform to process calls intended for the particular identity defines at least one call processing rule.

18. A method as claimed in claim 16, wherein the information indicative of at least one operation to perform to process calls intended for the particular identity relates to at least one telephony feature.

19. A method as claimed in claim 18, wherein the at least one telephony feature includes at least one of: a call forwarding feature, a selective call forwarding feature, a no-answer call forwarding feature, a find me / follow me call forwarding feature, a distinctive ringing feature, a selective call rejection feature, a selective call acceptance feature, a call waiting feature, a distinctive ringing call waiting feature, and a calling line identification displaying feature.

20. A method as claimed in claim 1, wherein the particular identity is a first particular identity, said method comprising:
    determining, based on the identifier of the calling party having originated the call, that the call is also intended for a second particular identity among the group of identities;
    wherein routing of the call is further based on information associated with the second particular identity.

21. A method as claimed in claim 1, wherein the party designated by a first identity of the group of identities is a first person and the party designated by a second identity of the group of identities is a second person.

22. A method as claimed in claim 1, wherein the party designated by each of a first identity of the group of identities and a second identity of the group of identities is a common person.

23. A method as claimed in claim 1, wherein the party designated by a first identity of the group of identities is a person and the party designated by a second identity of the group of identities is a plurality of persons.

24. An apparatus for processing a call placed to a telephony identifier, said apparatus comprising:
  a processing entity for:
    obtaining an identifier of a calling party having originated the call;
    identifying a group of destination identities associated with the telephony identifier, each destination identity designating a party reachable by calling the telephony identifier; and
    searching contact information respectively associated with the destination identities in the group of destination identities to identify a particular destination identity for which the respective contact information includes the identifier of the calling party having originated the call; and
  a routing entity for causing routing of the call based on information associated with the particular destination identity.

25. An apparatus as claimed in claim 24, wherein the telephony identifier is a telephone number.

26. An apparatus as claimed in claim 24, wherein the telephony identifier is a first telephony identifier and wherein the identifier of the calling party having originated the call comprises a second telephony identifier associated with a communication device from which the call originates.

27. An apparatus as claimed in claim 26, wherein the second telephony identifier is a telephone number.

28. An apparatus as claimed in claim 24, wherein the processing entity is further configured for obtaining a time at which the call has been originated.

29. An apparatus as claimed in claim 24, wherein the call is a current call and said determining comprises:
  consulting a call history of previous calls; and
  concluding from the call history and the identifier of the calling party having originated the current call that the current call is intended for the particular identity.

30. An apparatus as claimed in claim 29, wherein said concluding comprises determining that the particular identity has been involved in answering at least one previous call placed to the telephony identifier and originating from the calling party having originated the current call.

31. An apparatus as claimed in claim 29, wherein said concluding comprises determining that the particular identity has involved in placing at least one previous call to a destination corresponding to the calling party having originated the current call.

32. An apparatus as claimed in claim 24, said determining comprising:
  performing a search on at least one site of a data network on a basis of the identifier of the calling party having originated the call; and
  identifying, based on results of the search, a relationship between the particular identity and the calling party having originated the call.

33. An apparatus as claimed in claim 32, wherein the at least one site comprises at least one of a social networking site and a search engine site.

34. An apparatus as claimed in claim 24, wherein the information associated with the particular identity comprises information identifying a communication device associated with the particular identity, said causing routing of the call comprising causing routing of the call to the communication device.

35. An apparatus as claimed in claim 34, wherein the information identifying the communication device associated with the particular identity comprises a hidden identifier identifying the communication device.

36. An apparatus as claimed in claim 34, wherein said causing routing of the call comprises causing the communication device to present at least one of (1) an audible indication that the call is intended for the particular identity and (2) a visual indication that the call is intended for the particular identity.

37. An apparatus as claimed in claim 36, wherein the audible indication comprises at least one of a distinctive sound and an audio message, and the visual indication includes at least one of a displayed message and a light being lit up.

38. An apparatus as claimed in claim 36, wherein the visual indication comprises a displayed message within calling line identification information.

39. An apparatus as claimed in claim 24, wherein the information associated with the particular identity comprises information indicative of at least one operation to perform to process calls intended for the particular identity.

40. An apparatus as claimed in claim 39, wherein the information indicative of at least one operation to perform to process calls intended for the particular identity defines at least one call processing rule.

41. An apparatus as claimed in claim 39, wherein the information indicative of at least one operation to perform to process calls intended for the particular identity relates to at least one telephony feature.

42. An apparatus as claimed in claim 41, wherein the at least one telephony feature includes at least one of: a call forwarding feature, a selective call forwarding feature, a no-answer call forwarding feature, a find me / follow me call forwarding feature, a distinctive ringing feature, a selective call rejection feature, a selective call acceptance feature, a call waiting feature, a distinctive ringing call waiting feature, and a calling line identification displaying feature.

43. An apparatus as claimed in claim 24, wherein the particular identity is a first particular identity, said processing entity being operative for determining, based on the identifier of the calling party having originated the call, that the call is also intended for a second particular identity among the group of identities, wherein said routing of the call is further based on information associated with the second particular identity.

44. An apparatus as claimed in claim 24, wherein the party designated by a first identity of the group of identities is a first person and the party designated by a second identity of the group of identities is a second person.

45. An apparatus as claimed in claim 24, wherein the party designated by each of a first identity of the group of identities and a second identity of the group of identities is a common person.

46. An apparatus as claimed in claim 24, wherein the party designated by a first identity of the group of identities is a person and the party designated by a second identity of the group of identities is a plurality of persons.

47. A system for processing a call placed to a telephony identifier, said system comprising:
  means for obtaining an identifier of a calling party having originated the call;

means for identifying a group of destination identities associated with the telephony identifier, each destination identity designating a party reachable by calling the telephony identifier;

means for searching contact information respectively associated with the destination identities in the group of destination identities to identify a particular destination identity for which the respective contact information includes the identifier of the calling party having originated the call;

means for determining, based on the information regarding the origin of the call, that the call is intended for a particular identity among the group of identities; and means for causing routing of the call based on information associated with the particular destination identity.

48. Computer-readable media storing a program component for execution by a computer system to process a call placed to a telephony identifier, said program component comprising:

first program code for causing the computer system to obtain an identifier of a calling party having originated the call;

second program code for causing the computer system to identify a group of destination identities associated with the telephony identifier, each destination identity designating a party reachable by calling the telephony identifier;

third program code for causing the computer system to search contact information respectively associated with the destination identities in the group of destination identities to identify a particular destination identity for which the respective contact information includes the identifier of the calling party having originated the call; and fourth program code for causing the computer system to cause routing of the call based on information associated with the particular destination identity.

* * * * *